United States Patent
Lemilainen

(10) Patent No.: US 7,502,626 B1
(45) Date of Patent: Mar. 10, 2009

(54) SYSTEM AND DEVICE FOR ACCESSING OF A MOBILE COMMUNICATION NETWORK

(75) Inventor: Jussi Lemilainen, Arlington, MA (US)

(73) Assignee: Nokia Corporation, Espoo (FI)

(*) Notice: Subject to any disclaimer, the term of this patent is extended or adjusted under 35 U.S.C. 154(b) by 712 days.

(21) Appl. No.: 09/662,891

(22) Filed: Sep. 15, 2000

Related U.S. Application Data

(63) Continuation of application No. PCT/IB99/00557, filed on Mar. 18, 1998.

(30) Foreign Application Priority Data

| Mar. 18, 1998 | (GB) | ................................ 9805736.7 |
| Mar. 19, 1998 | (FI) | ..................................... 980623 |
| Mar. 19, 1998 | (GB) | ................................ 9805843.1 |
| Sep. 16, 1998 | (FI) | ..................................... 981995 |

(51) Int. Cl.
*H04M 1/00* (2006.01)

(52) U.S. Cl. .................. 455/554.2; 455/445; 455/74; 455/74.1; 455/552.1; 455/554.1; 455/555; 455/560; 379/220.01; 379/221.01; 379/221.15; 370/351; 370/395.5; 370/395.52; 370/395.53; 370/401; 370/467

(58) Field of Classification Search .............. 455/403, 455/426.1–426.2, 436, 450, 452.1, 452.2, 455/445, 464–465, 461, 458, 456, 444, 513, 455/552.1–553.1, 417, 422.4, 432.1, 439, 455/74, 74.1, 462, 554.1–2, 555, 560; 370/236, 370/351, 327–333, 395.5–54, 465–467; 379/55.1, 379/56.1–3, 156–157, 220.01, 221.01–2, 379/221.08–9, 221.1–15, 229–232, 165, 379/198

See application file for complete search history.

(56) References Cited

U.S. PATENT DOCUMENTS

| 4,969,184 | A | | 11/1990 | Gordon et al. | |
| 5,533,099 | A | * | 7/1996 | Byrne | ..................... 455/552.1 |
| 5,608,786 | A | | 3/1997 | Gordon | |
| 5,726,984 | A | | 3/1998 | Kubler et al. | |
| 5,774,805 | A | * | 6/1998 | Zicker | ..................... 455/426.1 |
| 5,793,762 | A | | 8/1998 | Penners et al. | |
| 5,832,378 | A | * | 11/1998 | Zicker et al. | ............. 455/552.1 |
| 5,890,064 | A | | 3/1999 | Widergen et al. | |
| 5,995,839 | A | * | 11/1999 | Coursey et al. | ............ 455/445 |
| 6,681,118 | B2 | * | 1/2004 | Raffel et al. | ............. 455/552.1 |

FOREIGN PATENT DOCUMENTS

| CA | 2131349 | 5/1995 |

(Continued)

OTHER PUBLICATIONS

International Search Report for PCT/US98/12536.

*Primary Examiner*—Tuan A Tran
(74) *Attorney, Agent, or Firm*—Foley & Lardner LLP

(57) ABSTRACT

A system, wherein a mobile station can switch to an IP access protocol, whereupon data transmitted between the mobile station and a mobile services switching centre change over from a base station system, reached using radio communication, to being transmitted through an interworking unit (40) coupled in connection with an IP connection and the mobile services switching centre. When the mobile station switches to the access network, it transfers the dynamic data relating to the mobile station's state and the calls in progress (state machine) to the interworking unit.

11 Claims, 11 Drawing Sheets

FOREIGN PATENT DOCUMENTS

| | | |
|---|---|---|
| EP | 0 622 924 A2 | 11/1994 |
| EP | 0735789 | 10/1996 |
| EP | 0766490 | 4/1997 |
| WO | WO 95/33348 | 12/1995 |
| WO | 9734429 | 9/1997 |
| WO | 9736442 | 10/1997 |
| WO | 9810617 | 3/1998 |
| WO | WO 98/58476 | 12/1998 |

* cited by examiner

SYSTEM AND DEVICE FOR ACCESSING OF A MOBILE COMMUNICATION NETWORK

This application is a continuation of PCT/IB99/00557 filed on Mar. 18, 1998.

BACKGROUND OF THE INVENTION

1. Field of the Invention

The present invention relates to mobile communication systems and particularly to a system for transferring information between a mobile station and a mobile communication network.

2. Description of the Prior Art

In modern office work it is necessary to provide the employees with versatile information transfer connections which can transfer speech, facsimile messages, electronic mail and other data—usually in digital form. Transfer of information is needed inside an office or corresponding working environment for communication between employees, for transfer of information between branch offices of an enterprise, which offices can be in other towns or even in other countries, and for communication between the office and "outside world". In this text and all of the following text "office" stands for an environment with several users, which users "belong together", and which office physically covers a reasonably limited area. There has been a trend in the telecommunication branch toward integrated systems in which various forms of telecommunication can be controlled as one entity.

A conventional realization of an above mentioned type of office communication system comprises a company telephone exchange for providing telephone services and telephones connected to it over twisted-pair connections and a separate local area network (LAN) in which applications for advanced telecommunication services have been implemented and which has the intelligence to run them. The local network is connected to the telephone exchange using a telecommunication server (Telephony Server) which supports the traditional subscriber server architecture in which subscribers are subscribers' computers connected to the local network. For example call-, data-, facsimile-, electronic mail- and speech mail services are connected within an office utilizing the telecommunication server. In an integrated system users can also e.g. control telephone services using their computer terminals connected to the local network. The whole integrated office communication system is connected to public telephone network through the telephone exchange.

FIG. 1 presents an example of a prior known office communication system in which users' telephones TP (Tele-Phone) have been connected by wire connections and a local area network (LAN) has been connected over a telecommunication server TS (Tele Server) into a telephone exchange PBX (Private Branch Exchange) which is connected to a public telephone network PSTN/ISDN (PSTN, Public Switched Telephone Network, ISDN, Integrated Services Digital Network). To the local area network (LAN) have been connected on one hand servers executing various services such as data base server DBS (Data Base Server), voice server VS (Voice Server) and electrical mail server EMS (Electrical Mail Server) and on the other hand the users' computers PC (Personal Computer). It can be regarded as a problem with this kind of realisation that even if a user's telephone TP and computer PC usually are on the same table next to each other separate wire connections must be laid to the user's working room for them, on one hand from the telephone exchange PBX and on the other hand from the telecommunication server TS of the LAN. Building and maintenance of two overlapping telecommunication networks naturally causes cost.

The problem of overlapping telecommunication networks is increased by portable mobile stations utilizing radio connection becoming rapidly more popular. Many persons working in an office need, because of their mobile work, a mobile station and often also a portable facsimile device and/or a combined portable computer/mobile station. In order to be able to use the devices based on radio connection also inside buildings, the constructions of which attenuate radio signals, It has been suggested that mobile radio networks should be supplemented with small base stations individual for offices or even for rooms, which base stations would be connected either directly or over wired telephone network to the central systems of mobile communication network. The network of small base stations would be already a third overlapping telecommunication network within the same office, and accordingly it is clear that in a preferable solution, which the present invention is aiming at, also the arrangement supporting radio communication stations should be realized using essentially the same means and telecommunication networks than the rest of the transfer of information in the office.

A challenge of its own to telecommunication systems is issued by the fact that work is done more and more in small-office or domestic environment, which is described by the concept SOHO (Small Office, Home Office). Even here advanced office communication services are often needed and it is particularly preferable if such a flexible system is available which can be utilized even both in the office and at home. The present systems which require overlapping connections for the utilization of mobile communication services, conventional telephone services and fast data transfer services are very inflexible for working in a small- or home office. In addition to above, the following kinds of solutions connected with integrated telecommunication systems are known from prior art.

If an integrated office communication system is realized utilizing traditional technique, separate wired connections must be laid into a user's working room on one hand from telephone exchange PBX (FIG. 1) and on the other hand from telecommunication server TS of local area network (LAN). In order to contact a subscriber through different exchanges and servers one has to use several numbers and addresses. To manage a number of addresses for each user complicates things both for subscribers themselves, as well as to the people trying to contact them. In earlier applications according to prior art a solution to these problems has not actually been sought.

SUMMARY OF THE INVENTION

According to one aspect of the present invention, there is provided a system for transferring information between a mobile station and a mobile communication network, the system comprising:

the mobile station;

the mobile communication network;

a communication network for interfacing the mobile station and the mobile communication network;

wherein the communication network is arranged to comprise a mobile station emulator when the mobile station is coupled to it.

The mobile station emulator looks like a mobile station to the mobile communication network. Consequently, it eliminates the need for a user to access the mobile communication network using his mobile station. Instead, for example, he may use a lightweight terminal such as a wristwatch and headset. Also, whether using a terminal or the mobile station, this device may communicate with the communication system using simple signalling (such as Bluetooth), instead of the mobile communication protocol signalling (e.g. GSM). Furthermore, it enables call forwarding even during a call.

The mobile station emulator (virtual mobile station) may be established in an interworking unit of the communication network. For example, it may be provided in part of the network operators equipment, between an IP network and mobile communications network. Alternatively, it may be provided in the subscriber's equipment. For example, it may be provided in a personal base unit (which itself may be incorporated into a PC, for example).

The provision of a mobile station emulator eliminates the need to use the mobile station to obtain mobile communication services. Instead the user may have an alternative terminal such as a wrist watch and headset or PC and headset.

According to this aspect, there is also provided a mobile station emulator for interfacing a mobile station and a mobile communication network, the emulator comprising:

means for receiving call transfer information from the mobile station and for forwarding it over a communication network to the mobile communication network, upon coupling of the mobile station to the communication network; and means for maintaining the call transfer information while the mobile station remains coupled to the communication network.

According to a second aspect, there is provided a system for transferring information between a mobile station and a mobile communications network (MOB), the system comprising:

a mobile station;

a communication network coupled to the mobile communications network;

a base transceiver station emulator for interfacing the mobile station and the communication network;

wherein:

the mobile station has been arranged to transfer to the base transceiver station emulator call status data relating to a communication between the mobile station and the mobile communication system, as a response to the mobile station beginning to communicate with the base transceiver station emulator; and the base transceiver station emulator has been arranged to transfer to the mobile station call status data relating to a communication between the mobile station and the mobile communication system, as a response to the mobile station proceeding to end communicating with the base transceiver station emulator.

According to the second aspect, there is also provided a mobile station further comprising;

first transfer means for controlling transfer of information in at least two modes, wherein the first mode is associated with transfer of information between the mobile station and a base station sub-system of the mobile communication network, and the second mode is associated with transfer of information between the mobile station and a base transceiver station emulator;

second transfer means for transferring call status data relating to communication between the mobile station and the mobile communication system to the base transceiver emulator when entering the second mode from the first mode, and for receiving call status data relating to communication between the mobile station and the mobile communication system from the base transceiver station emulator when entering the first mode from the second mode.

According to this second aspect, there is further provided a device for emulating a base transceiver station, comprising:

a first interface unit for communicating with the communication network, a second interface unit for providing access to a mobile station of a mobile communications network;

transceiving means for receiving call status data relating to communication between the mobile station and the mobile communication system to the base transceiver emulator from a mobile station beginning to communicate with said device, and for transferring call status data relating to communication between the mobile station and the mobile communication system to the mobile station proceeding to end communicating with said device.

In an embodiment of this second aspect of the invention, the system comprises a mobile communication network for providing mobile telecommunication services for subscribers. The mobile communication network is linked to a communication network, which comprises a Base Transceiver Station Emulator (BTSE) for interfacing the mobile station and the communication network. When the mobile station moves to the coverage area of the BTSE, it transports the dynamic data relating to the state of the mobile station and the calls in progress (state machine) to the BTSE. As a response to this data, a virtual terminal corresponding to the mobile station and emulating the functions of the actual mobile station towards the mobile communication network is established in the BTSE. When the subscriber returns to the normal mobile communication operation, the BTSE will transfer the state machine to the mobile station and end the operation of the virtual terminal.

After the virtual terminal is established, the information from mobile communication network is transferred through the communication network and the BTSE to the virtual terminal. During operation, the virtual terminal is able to manage independently at least part of the mobile communication network specific signalling normally exchanged between the actual terminal and the base station. This enables the use of the actual mobile terminal in another, preferably simplified mode, or even the replacement of the mobile terminal by another type of terminal. Such other terminal may be implemented by e.g. a wireless lightweight terminal equipment, like a combination of a wireless headset and a wrist user interface. Such terminal can also be a terminal software element integrated to the user interface of the Personal Computer (PC) of the subscriber. The subscriber will thus have the opportunity to utilize communication networks, such as private intranets to carry services of cellular mobile communication network whenever access to communication network is available and also the freedom to choose a terminal equipment best suiting to his personal needs and the current situation.

In the coverage area of the BTSE, the subscriber will have a choice to utilize the services of the mobile communication network normally through the base station subsystem or through the LAN via BTSE. Since the state machine is transferred between the BTSE and the mobile station whenever the operating mode is changed, the subscriber can actually roam between the mobile communication mode and the network mode without necessarily even being aware of the current mode of the operation. No manual switching interfering with the proceeding calls is necessary.

According to a third aspect of the invention, a mobile communication system is provided comprising a mobile services switching center, base station systems connected to the mobile services switching center, mobile stations, which have been arranged to establish a first communication connection and to communicate with the mobile services switching center through a base station system using radio communication by using a specified signalling protocol in said first communication connection, wherein a mobile station has been arranged to maintain call status data, during said first communication connection, relating to its communication with the mobile services switching centre and that the mobile communication system comprises a data transmission network, wherein data have been arranged for being transported in a specified data network protocol format, means for connecting the mobile station for communication to said data transmission network for establishing a second communication connection implemented through the data transmission network to the mobile services switching center, means for switching said communication connection between said first and second communication connection, an interworking unit, which has been connected between the mobile services switching center and said data transmission network for transmitting the mobile station's calls between the mobile station and the mobile services switching center during said second communication connection, and which has been arranged to maintain call status data, during said second communication connection, relating to the mobile station's communication with the mobile services switching center, and that the mobile station has been arranged to transfer to the interworking unit and the interworking unit has been arranged to receive from the mobile station said call status data, when the communication connection switches from the first to the second communication connection, the interworking unit has been arranged to transfer to the mobile station and the mobile station has been arranged to receive from the interworking unit said call status data, when the communication connection switches from the second to the first communication connection.

According to this third aspect, a method for routing the communication between the mobile station and the mobile services switching center of the mobile communication system is also provided, which comprises:

a mobile services switching center, base station systems connected to the mobile services switching center, and mobile stations, in which method a first communication connection is established between the mobile station and the mobile services switching center using radio communication, through a base station system, and said communication connection is used for communication using a specific signalling protocol in said first communication connection.

wherein call status data are maintained in the mobile station relating to its communication with the mobile services switching center, the mobile station is connected for communication to a data transmission network, wherein data are transported in a specific data network protocol format for establishing a second communication connection to the mobile services switching center carried out through the data transmission network, the switching of the communication connection between said first and second communication connection is allowed, calls are transmitted between the mobile services switching center and said data transmission network through an interworking unit, and call status data relating to the mobile station's communication with the mobile services switching center during said second communication connection are maintained in the interworking unit, said call status data are transported from the mobile station to the interworking unit and received by the interworking unit from the mobile station, when the communication connection changes from the first to the second communication connection, said call status data are transported from the interworking unit to the mobile station and received by the mobile station from the interworking unit, when the communication connection changes from the second to the first communication connection.

BRIEF DESCRIPTION OF THE DRAWINGS

Embodiments of the present invention will now be described, by way of example, with reference to the accompanying drawings, of which.

DESCRIPTION OF THE PREFERRED EMBODIMENT

The embodiments of the invention will be described using the terms and elements of a digital mobile communication network GSM (Global System for Mobile Communications). It is appreciated that the invention can be used in connection with any functionally equivalent mobile communication network, such as the NMT (Nordic Mobile Telephone), the AMPS (Advanced Mobile Phone Service), the DECT (Digital European Cordless Telecommunications), the DCS1800 (Digital Cellular System for 1800 MHz), etc. Neither is the selection of the access network essential as regards the present invention. The solution can correspondingly be applied in connection with other fixed and wireless access techniques, such as the WLAN (Wireless Local Area Network), the Ethernet, the ATM (Asynchronous Transfer Mode), the WATM (Wireless Asynchronous Transfer Mode), the HIPERLAN, the LPRF (Low Power RF), etc.

Figure 9:
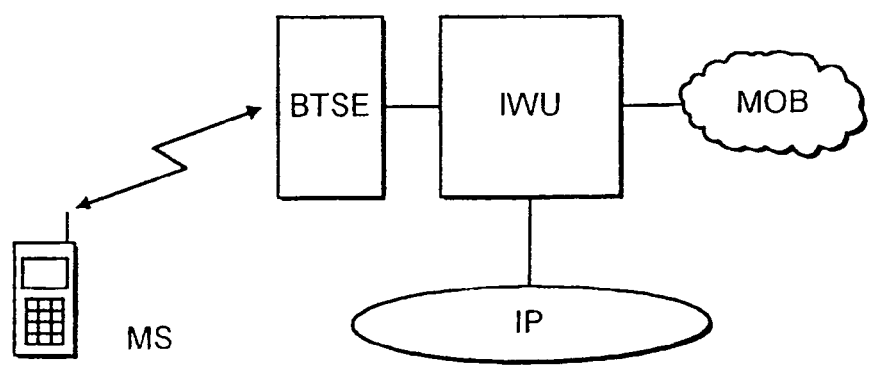
FIG. 9 illustrates the basic elements of a communication system according to an embodiment of the present invention.

FIGS. 2 to 8 illustrate a first embodiment in which a virtual mobile station is established in operator's equipment, and FIG. 9 onwards illustrate a second embodiment in which the virtual mobile station is in the user's equipment.

Figure 1:
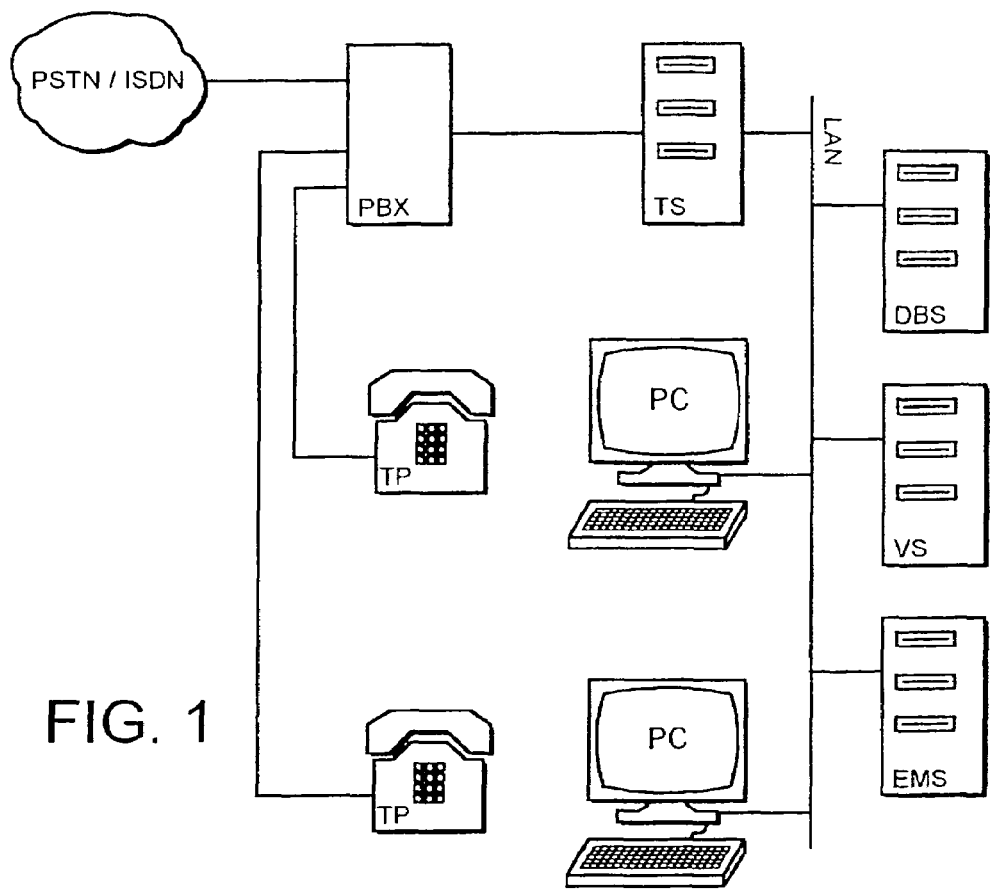
FIG. 1 presents an example of a prior known office communication system
Figure 2:
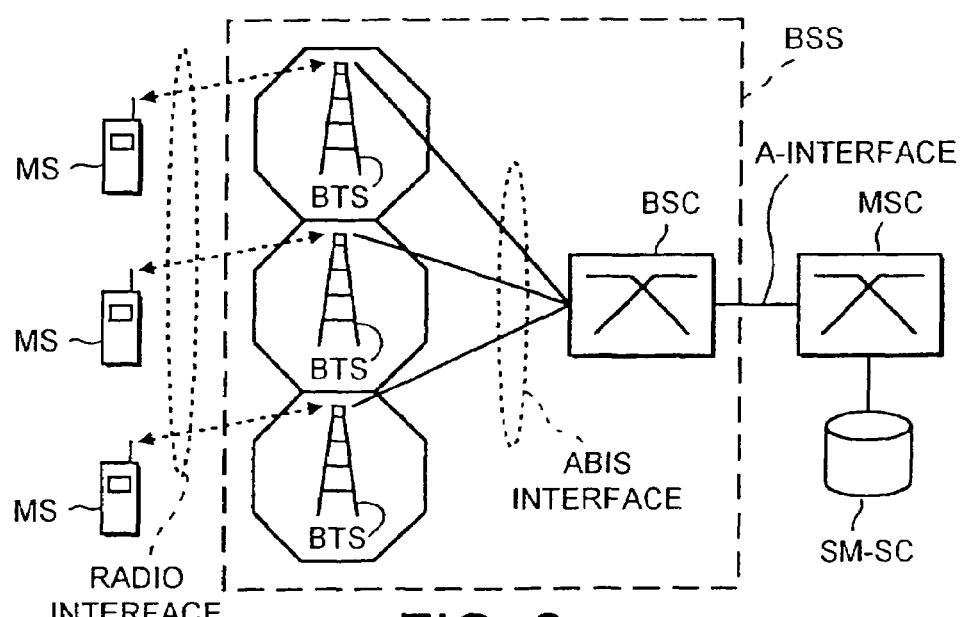
FIG. 2 is a block diagram illustrating the basic elements of the GSM system.

The block diagram in FIG. 2 illustrates the basic elements of the GSM system. Mobile stations MS are in connection with base stations BTS using radio communication. The base stations BTS are further, through a so-called Abis interface, connected to a base station controller BSC, which controls and manages several base stations. The entity formed by several base stations BST and a single base station controller BSC controlling them are called a base station system BSS. Particularly, the base station controller BSC manages radio-communication channels, as well as handovers. On the other hand, the base station controller BSC is, through the so-called A interface, in connection with a mobile services switching center (MSC), which co-ordinates the establishment of connections to and from mobile stations. Through the mobile services switching center MSC, a connection can further be established to a subscriber not operating under the mobile communication network.

Figure 3:
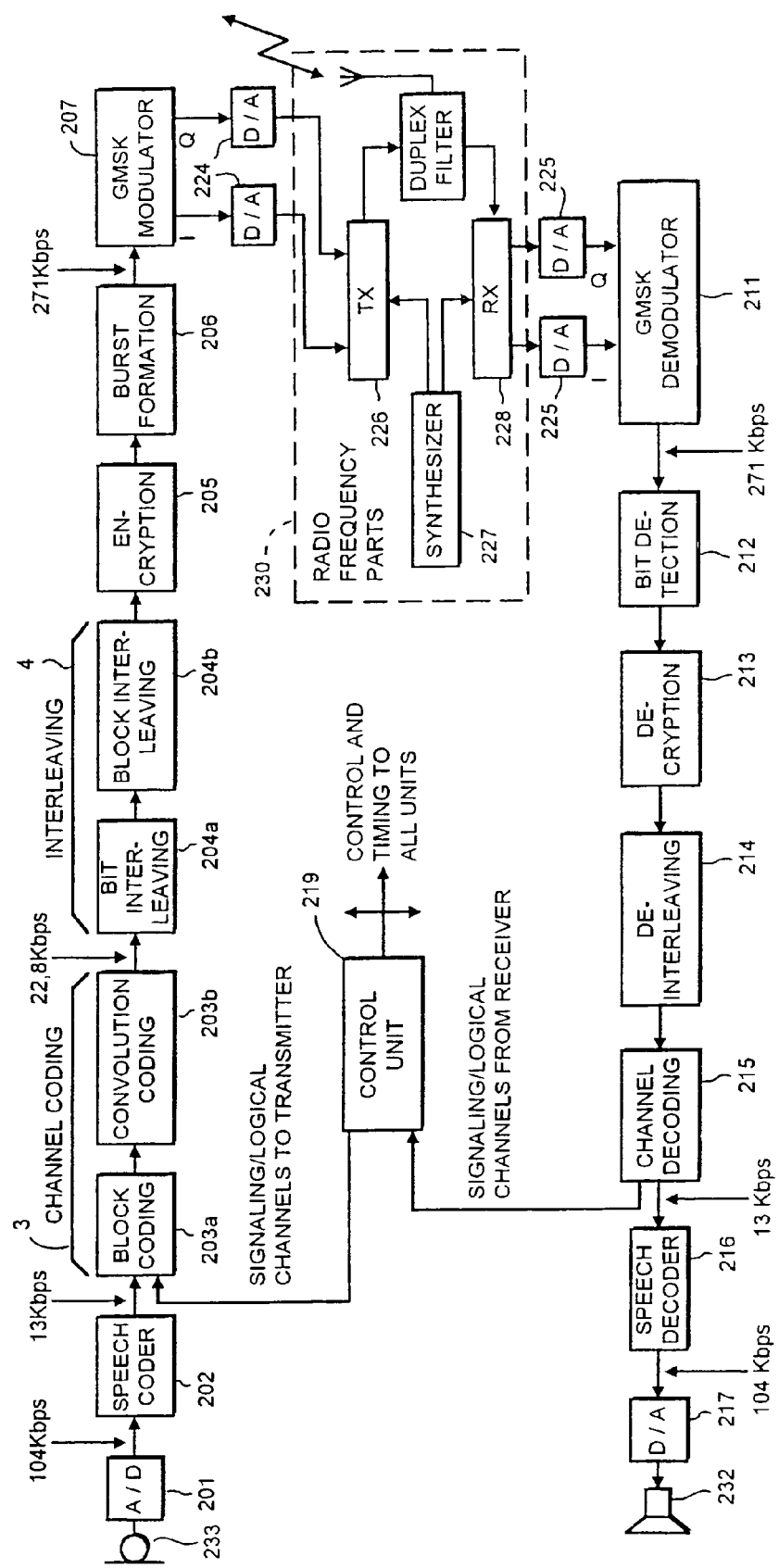
FIG. 3 is a block diagram illustrating in more detail the transmission and reception functions of a GSM mobile station.

The block diagram in FIG. 3 illustrates in more detail the transmission and reception functions of a mobile station in accordance with the GSM system. The first phase of a transmission sequence is analog speech digitation 201 and coding 202. A sample is taken by an A/D converter 201 at a frequency of 8 kHz and a speech-coding algorithm assumes that the incoming signal is of 13-bit linear PCM. The samples provided by the A/D converter are segmented to 160-sample speech frames, whereupon the duration of each speech frame is 20 ms. The speech coder 202 processes the 20-ms speech frames, in other words, 20 ms of speech is taken into a buffer before the coding begins. The coding operations are carried out frame-specifically or as their sub-frames (as blocks of 40 samples). As a result of the coding of the speech coder 202, one frame produces 260 bits.

After speech coding 202, channel coding 203 is carried out in two phases whereupon, first, some (50 most important) of the bits (260 bits) are protected by a block code 203a (=CRC, 3 bits) and, then, these and the next most important bits (132) are further protected by a convolution code 203b (coding ratio 1/2) ((50+3+132+4)*2=378), and some of the bits are taken unprotected (78). As illustrated in FIG. 3, the signalling and logical messages come directly from a control unit 219, that controls the mobile station's blocks, to the block coding block 203a and, naturally, no speech coding is carried out for these data message. Correspondingly, the signalling and logical messages received at the reception are taken from a channel-decoding block 215 to the control unit 219. In block coding 203a, a bit sequence is connected to the end of the frame by means of which transport errors can be detected at the reception. In convolution coding 203b, the redundancy of the speech frame is increased. Thus, a total of 456 bits are transmitted per one 20-ms frame.

These 456 bits are interleaved 204 and the interleaving 204 also has two phases. First, the order of the frame bits is mixed 204a and the mixed bits are divided into eight blocks of the same size. These blocks are further divided 204b into eight successive TDMA frames, whereupon the 456 interleaved bits are transmitted in eight timeslots on the radio path (57 bits in each). The purpose of interleaving is to spread the transfer errors, which normally occur as error bursts, evenly over the entire transmitted data, whereupon channel decoding is more effective. After de-interleaving, the error burst turns into separate error bits, which can be corrected in channel decoding. The next phase in the transmission sequence is data encryption 205. Encryption 205 is implemented by means of an algorithm, which is one of the most closely guarded secrets of the GSM. By means of encryption, unauthorized listening of calls which is possible in analog networks, is prevented.

Of the encrypted data, the burst to be transmitted is formed 206 by adding thereto a training period, tail bits and a protection period. The burst to be transmitted is taken to a GMSK modulator 207, which modulates the burst for transmission. The GMSK modulation method (Gaussian Minimum Shift Keying) is a digital, standard-amplitude modulation method, wherein information is included in the changes of a phase. A transmitter 226 mixes the modulated burst through one or more intermediate sequences for 900 megahertz and transmits it through an antenna to a radio interface. The transmitter 226 is one of three radio frequency blocks 30. A receiver 228 is the first bock on the reception side reversing the operations of the transmitter 226. The third RF block is a synthesiser 227, which takes care of the formation of frequencies. The GSM system has frequency hopping in use, wherein the transmission and reception frequencies change in every TDMA frame. Frequency hopping improves the quality of the connection, but set strict requirements on the synthesiser 227. The synthesiser 227 must be able to switch from one frequency to another very rapidly; in less than a millisecond.

At the reception, the transmission operations are reversed. After a RF receiver 28 and a demodulator 211, a linear detection is made 212, e.g., by a channel equalizer of the received samples the aim being to find out the transmitted bit sequence. After detection, decryption 213 and de-interleaving 214 are carried out, channel decoding 215 is implemented for the detected bits and the error sum is checked by cyclic redundancy check (CRC). In channel decoding 215, the aim is to correct the bit errors due to the transfer of the burst. The 260 bit long speech frame, subsequent to channel decoding 215, contains the transmitted parameters describing speech by means of which a speech decoder 216 forms digital samples of the speech signal. The samples are D/A converted 217 for a speaker 32 for reproduction. In the transmitter/receiver, the main unit controlling the mobile station is the control unit 219, which essentially controls the blocks described above, coordinates their functions and controls the timing.

Figure 4:
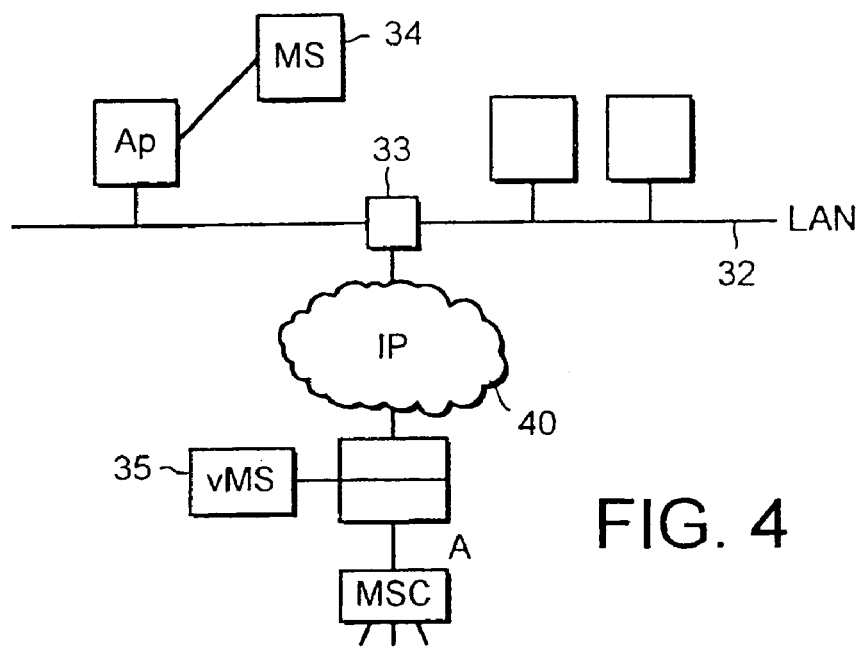
FIG. 4 is a block diagram illustrating a system according to the invention.

The block diagram in FIG. 4 illustrates an arrangement, according to an embodiment of the present invention, for using the services of a mobile communication network through an IP access protocol. An interworking unit 40 (IWU) has been connected to a mobile communication system's mobile services switching center 31, whose interface towards the mobile services switching center corresponds to a normal interface of a base station controller BSC, i.e., the A interface and, towards the IP network, it corresponds to a normal interface between the IP network and an IP terminal. The IWU is a new network element according to the present invention, which comprises necessary means for interlinking the functionalities of the mobile communication system and the IP network. The element AP presents the IP network's connection point.

Figure 5:
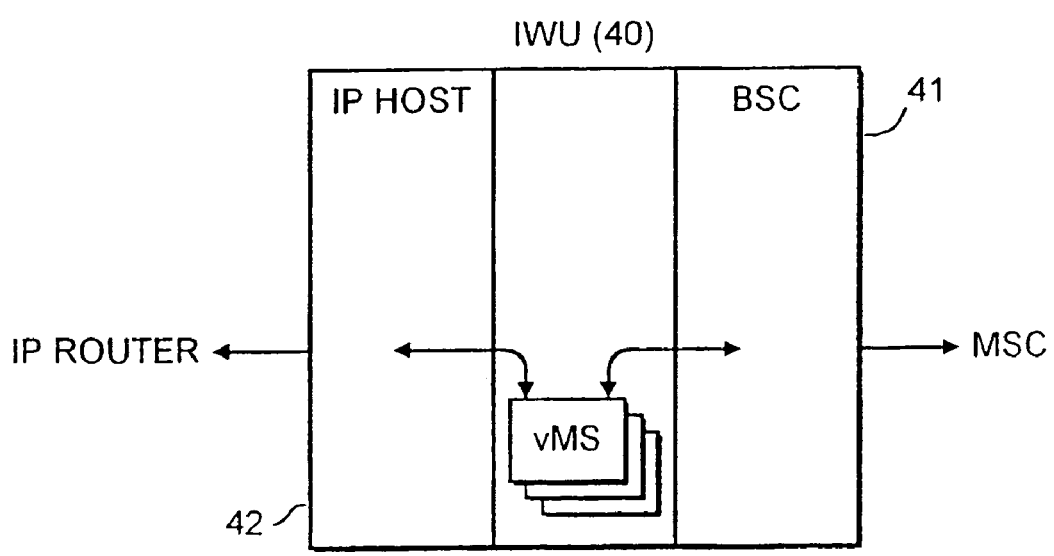
FIG. 5 is a block diagram illustrating the structure of an interworking unit.

The structure of the interworking unit 40 has been illustrated by means of the block diagram in FIG. 5. The interworking unit 40 comprises a first functional block 41, which comprises means for emulating the base station controller of the mobile communication system towards the mobile services switching center. The IWU also comprises a second functional block 42, which comprises means for functioning as an IP host towards the Internet or a corresponding telecommunications network, such as the ISDN, AMT, etc. There is third functional block between the first and the second functional blocks, which comprises means for establishing one or more virtual terminals. The generation and operation of virtual terminals is discussed below in more detail.

With reference to FIG. 4, the company's local area network LAN 32 is connected to a public IP network through an IP router 33. In a system, according to the invention, a mobile station comprises means for switching to an access network; the mobile station, presented in FIG. 4, is coupled to the LAN 32, for example, by connecting the mobile station to a personal computer coupled to a subscriber's LAN using a cable, an infrared connection or a radio transmitter-receiver pair. The manner in which the mobile station is coupled to the network point is not essential as regards the invention. Later, it is possible that mobile stations will be equipped with sufficient IP functionality, whereupon no separate terminal is required. In the example presented in FIG. 4, the mobile station switches to a fixed access point of a local area network. The access point can also be some other access point, for example, that of a wireless local area network, as is demonstrated later.

By means of its control unit, the mobile station can make a decision on switching to the access network after noticing, for example, that it is in the subscription area of a wireless access network. When the mobile station is connected to the network through a terminal, the mobile station will detect the switching or unswitching, for example, from an indicator 37B of an indication signal of the selected core of a multicore cable or of an information access service (IAS) statutory for equipment in accordance with the IrDA standard.

In connection with switching to the local area network, the mobile station transfers the dynamic data relating to the state of the mobile station and the calls in progress to the interworking unit through the IP network. After this, the mobile station's traditional radio frequency parts switch off and the mobile station changes over to communicate with the interworking unit 40 through the IP network. With reference to FIG. 3, said arrangement means that, for example, blocks 233, 201, 202, 216, 217, 219 and 232 are maintained and the rest of the blocks are switched off, whereupon the mobile station transmits and receives speech coded in accordance with the 13 Kbps GSM specification. When operating in the GSM system, a mobile station 34 signals with a mobile services switching center 31 over a base station controller. When the mobile station 34 changes over to the network mode, it no longer continues said signalling and signalling is transported to be carried out elsewhere for maintaining the connections. Therefore, the interworking unit 40 is not an element that only carries out protocol conversions; it also contains a functional unit 43 for maintaining virtual terminals.

When changing over to the IP mode, the mobile station 34 transfers the dynamic data relating to the state of the mobile station and the calls in progress to a virtual terminal vMS 35 to be established in the interworking unit 40. These data are maintained in a state machine, which is located in the virtual terminal. In this context, the state machine means a functional entity that describes the allowed changes in the state relating to the functioning of the mobile station and the related messages according to the protocol. The functionality part described by the state machine maintains the data on the possible changes in the state relating to said protocol layer, the instantaneous state, the data structures relating to the change in the state, etc. Thus, a state machine in connection with the GSM means the mobile station's functionality part, which controls the functionalities relating to the mobile station's GSM Layer 3 protocol (NULL, current switched on, switched to a base station, etc.) In addition, this state machine of the upper most level maintains a partial state machine for the mobile station's every connection, whereupon the state of the connection can be, for example, NULL, call initiated, call proceeding, active, etc.

Figure 6:
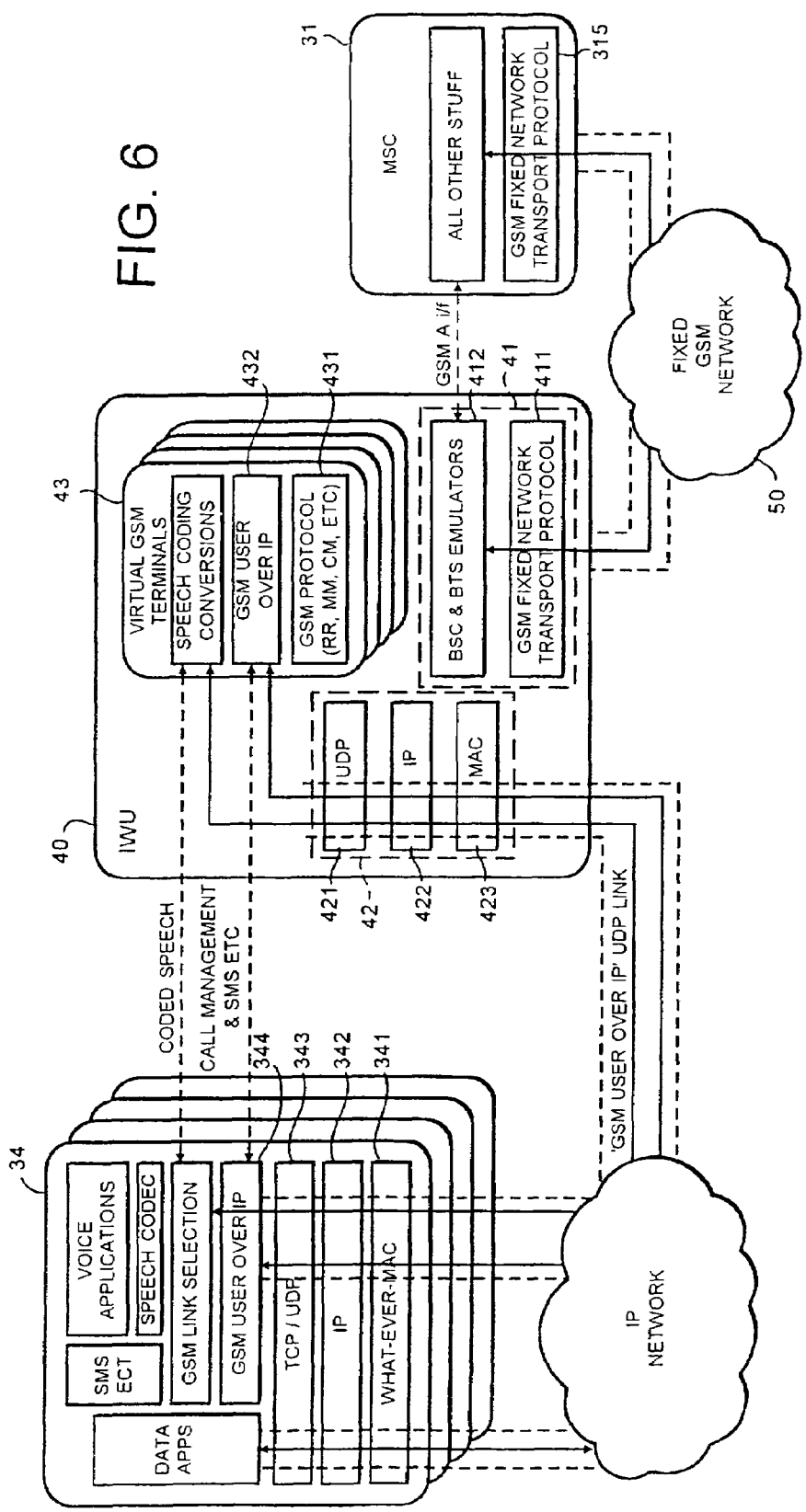
FIG. 6 is a block diagram illustrating the functionality of a mobile station in connection with the implementation of a virtual terminal.

The simplified block diagram presented in FIG. 6 illustrates an implementation of the mobile station's functionality and the division of its hierarchy in connection with the establishment of a virtual terminal. The interworking unit 40 has been connected to the mobile services switching center 31 through a fixed network of the GSM system, whereupon the bottom layer of the protocol stack of the mobile services switching center 31 and the interworking unit 40 is a transport protocol 315, 411 of a fixed network 50 of the GSM system. In addition to the above-mentioned transport protocol 411, the block 41 of the interworking unit comprises layers 412 required for emulating a network sub-system. A block 42 of the interworking unit comprises protocols UDP 421, IP 422 and MAC 423 relating to IP communication. Corresponding protocols 341, 342, 343 are found in the protocol stack of the mobile station 34 that operates in the network mode. The protocol stack of the virtual terminal 43 comprises the GSM functionality entity described by a state machine 431, which comprises at least a radio resource (RR), mobility management (MM) and call management (CM). Above this, there is a protocol 432 (GSM over IP) relating to communication between the interworking unit and the mobile station operating in the network mode. This will be discussed later in more detail. A corresponding protocol 344 is found in the mobile station operating in the network mode, which also comprises the necessary applications for processing the basic services (speech, short message, telecopy) of a mobile communication system.

Typically, maintaining the state machine in the virtual terminal 35 is an application-specific solution, because the virtual terminal must maintain data on the state of the connection in the direction of both the mobile communication system and the mobile station 34. On the basis of the status data maintained in the virtual terminal, the signalling of the virtual terminal can be controlled in the direction of both the mobile communication network and the mobile station. It should be noted that due to the state machine maintained by the virtual terminal, the signalling to be implemented in different directions is independent of the protocol, in other words, the changing of the protocol in either direction does not interrupt the functioning of the virtual terminal.

To enable the functioning of the virtual terminal, in addition to the mobile station status data the interworking unit requires the data stored in a subscriber identity module: the SIM card. The SIM card is an intelligent card, wherein the identification information on both the subscriber and the terminal, as well as an information field containing various types of data defined by the GSM standard and provided by the subscriber, have been stored. For a more detailed description of the SIM card, refer to the pages 67-71, 444-492 and 561 of the above-mentioned Mouly-Pautet's GSM guide. As regards the present invention, the most important part of the data contained in the SIM card can be kept as static information, whereupon corresponding information can be kept stored in the memory of the interworking unit.

When the interworking unit has the use of the data of both the state machine and the SIM card, the IWU 40 starts the virtual terminal 35, which emulates the functioning of the actual mobile station 34 towards the mobile communication system. It receives signals of the mobile communication system through the first functional block 41 of the interworking unit and, on the basis of the status data it maintains, it carries out signalling towards the mobile communication system. It receives, through the second functional block 42 of the interworking unit, the data in accordance with the IP transmitted by the actual terminal, compares the message to the status data it maintains and, on the basis of it, generates a signal required at the time in question for being transmitted by the mobile communication system.

Figure 7:
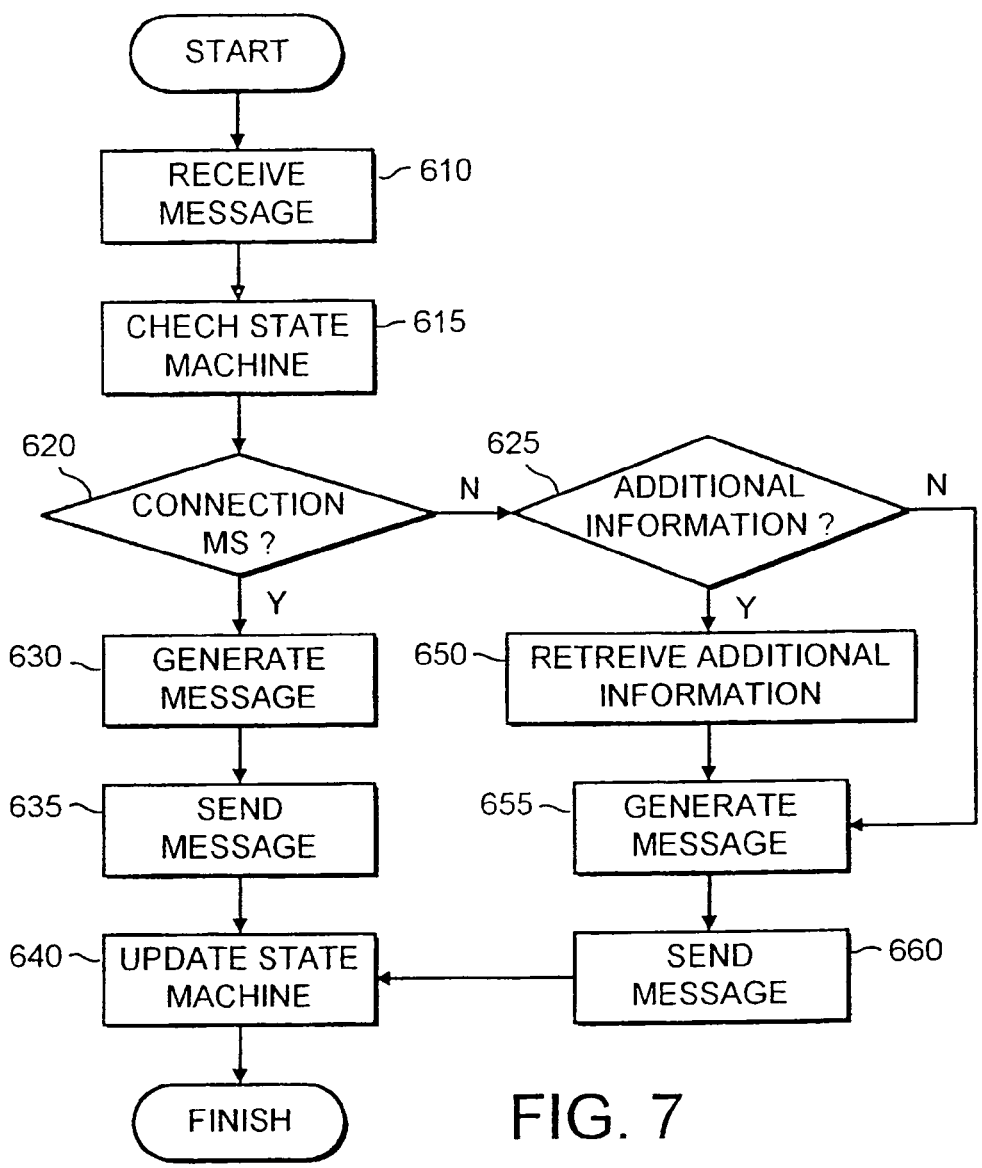
FIG. 7 is a flow diagram presenting the operation of the virtual terminal on the basis of a message that has arrived from a mobile communication system.

The flow diagram presented FIG. 7 illustrates the functioning of a virtual terminal on the basis of a message arrived from a mobile communication system. In point 610, the virtual terminal 35 receives a message through the first functional block 41 of the interworking unit. In point 615, the virtual terminal compares the checked message to the state machine it maintains and, on the basis of it, defines the message required for changing over to the next state. In point 620, the virtual terminal defines whether a connection to the mobile station 34 that operates in the network mode is required for generating the next signal or whether the required data are included in the subscriber information stored in the interworking unit. If a connection to the mobile station is necessary, the virtual terminal generates the message relating to said function (point 630) and sends it through the IP network to the mobile station 34 (point 635). At the same time, it updates the state of the process in question to the signalling state maintained by it (point 640). If no connection the mobile station 34 is required and the virtual terminal concludes that the necessary signal can be managed by itself, the virtual terminal checks whether the subscriber information stored in the interworking unit is required for the reply or whether the reply message can directly be generated on the basis of the status data (point 625). If additional information is required, the virtual terminal retrieves it from the interworking units database (point 650) and, on the basis of it, generates a message to be transmitted to the mobile communication system (point 655). If no additional information is required, the virtual terminal generates a message in accordance with the mobile communication system's protocol defined on the basis of the status data (point 655). At point 660, the message generated by the virtual terminal is transmitted to the mobile services switching centre through the first functional block 41 of the interworking unit. At the same time, the virtual terminal updates the state of the process in question in the state machine it maintains (point 640).

One way of managing a connection between the interworking unit and the mobile station is to convert the GSM signalling into packets in accordance with the IP and to transfer the signalling to the mobile station in the GSM format. As can be concluded on the basis of FIG. 3, signalling between the mobile station and the mobile services switching center includes a lot of signalling relating to the use of a radio resource the transfer of which in the arrangement according to the invention is unnecessary. Hence, a connection over an IP link should preferably be managed by simplifying the protocol during network operation. This kind of protocol can be established, for example, by selecting a group of AT commands, which are transported over a UDP/TCP protocol layer or by using methods in accordance with the H.323 protocol family standardized by the ITU-T. For the establishment of a connection, a simple, manufacturer-specific protocol can also be defined.

The implementation of the protocol can be illustrated by giving an example of the functions, which are separated from one another between a mobile station that operates in the network mode and an interworking unit. These include, for example, the functions 1.1.-1.7. listed in the first column of Table 1. The second column of Table 1 contains a functional description of messages, which are separated from one another by means of a protocol according to the invention.

TABLE 1

| Reference | Function | Messages |
|---|---|---|
| 1.1 | Making of Call | Request to Call MS->IWU Resetting of Request to Call IWU->MS |
| 1.2 | Reception of Call | indication of Call IWU->MS Resetting of Indication of Call MS->IWU |
| 1.3 | Speech | Transport of Coded Speech Over UDP |
| 1.4 | Ringing Out | Request for Switching Off/Indication |
| 1.5 | SMS | SMS Transmission/Reception Over UDP or TCP |
| 1.6 | FAX | Telecopy Transmission/Reception Over UDP or TCP |
| 1.7 | Handover | Handover Message Transmission/Reception (State Machine) |

When a subscriber wants to make a call through a mobile communication network (1.1), a mobile station makes a request for a call and receives the message of the making of the call given by an interworking unit, before the transfer of the data relating to the call begins. When the subscriber receives a call (1.2), the mobile station receives the message of the incoming call from the interworking unit and informs the interworking unit of the reception of the call before the transfer of the data relating to the call begins. When either the subscriber or the other party wants to cut off the call (1.3), the mobile station gives or receives a request to cut off the call. On the basis of the protocol, both the mobile station and the interworking unit should be able to distinguish whether it is a question of the transfer of speech (1.4), a short message (1.5) or telecopied data (1.6). The message 1.7 contains the status data on the calls in progress, which are transported when the virtual terminal is taken into use or when the use of the virtual terminal is terminated as described above. The above-mentioned command group is one possible way of implementation. For example, making a call can be arranged so that the mobile station identifies, on the basis of the first speech packets, that it is a question of call in which case not even a separate call phase is required. Correspondingly, the virtual mobile station unit can be automatically adapted to cut off the call when the reception of the call packet from the mobile station stops. With a simple command group, it is possible to implement adequate functions by means of which the mobile station that operates in the network mode can utilize the mobile communication network's services through an IP network connection.

The simplified arrangement presented above illustrated the functionality of both an interworking unit according to the invention and a virtual terminal to be established therein, as well as their connection to a mobile station operating in the network mode. By connecting the Mobile IP to the arrangement presented above for utilizing the functions of a mobile communication network through the interworking unit functioning as an IP terminal, in accordance with FIG. 8, a system is presented that provides the subscriber with an opportunity to utilize the services of one's own mobile communication system anywhere, where an Internet connection is possible, independent of the available access technique.

The Mobile IP is a protocol, which is currently being standardized. For its more detailed description, reference should be made to the Internet Engineering Task Force (IETF) instructions Request For Comments (RFC) 2002. The Mobile IP describes the home agent (HA) of a network element to be connected to the home network of a mobile subscriber. When the subscriber moves away from the home network, the HA maintains the data on the subscriber's address and routes the data packets, assigned to the mobile subscriber, to the address at which the subscriber is registered at that particular moment. Thanks to this, the data packets are routed to the subscriber's new address without a significant number of them being lost due to the transfer. The connection between the mobile station that operates in the IP mode and the interworking unit can be maintained due to the Mobile IP, whereupon a virtual mobile station that operates within the interworking unit seems to remain in the same cell as for the mobile communication network, when it operates through the same home networks home agent.

Figure 8:
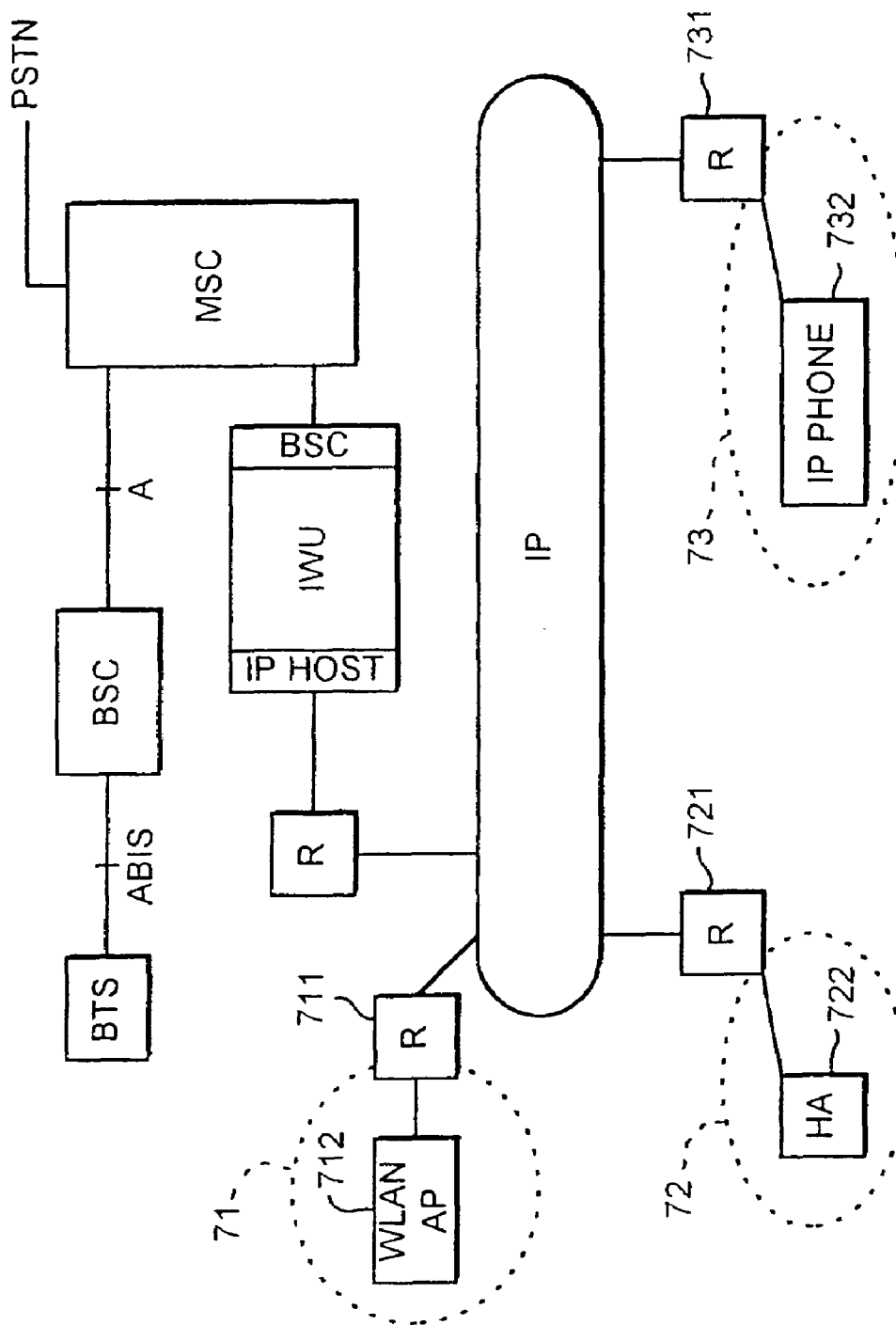
FIG. 8 is a block diagram illustrating a system architecture according to an embodiment of the present invention.

The block diagram in FIG. 8 illustrates an arrangement according to the invention presented above. The mobile communication system containing an interworking unit, according to the present invention, has been connected, through the interworking unit, to an IP network. Different access networks 71, 72 and 73, reached through routers 710, 711, 721, 731 of the IP network, provide the mobile communication system's mobile station with IP access points 712, 722, 732. The IP network is formed of a large number of MAC-level access networks many of which support the subscriber's mobility in the access network in question (e.g., 802.11 and WATM). The Mobile IP enables mobility between the IP access protocols, for example, between two separate WLANs or between an Ethernet and a WLAN. A mobile communication system, for example GSM, enables mobility over the Mobile IP between mobile communication networks. Thus, an arrangement according the present invention produces an extended functionality that supports mobility between a mobile communication network and an IP network, and the subscriber is provided with an opportunity to preferably maintain a flexible and uninterrupted connection within an extremely wide service area.

FIG. 9 illustrates an architecture for a system according to an embodiment of the invention. The system comprises a mobile station MS, a mobile communication network MOB e.g. Public Land Mobile Network (PLMN), and a communication network IP, all connected by virtue of an inter-working unit IWU. Interfacing the IWU and the MS is a base transceiver emulator BTSE. These elements will next be explained with more detail.

The mobile station MS is a generic terminal product portfolio consisting of full-featured cellular phone that supports services of mobile communication network. When no access to the communication network IP is available, the MS transfers information (such as speech and data) through the MOB in a normal way as explained with FIG. 2.

Figure 10:
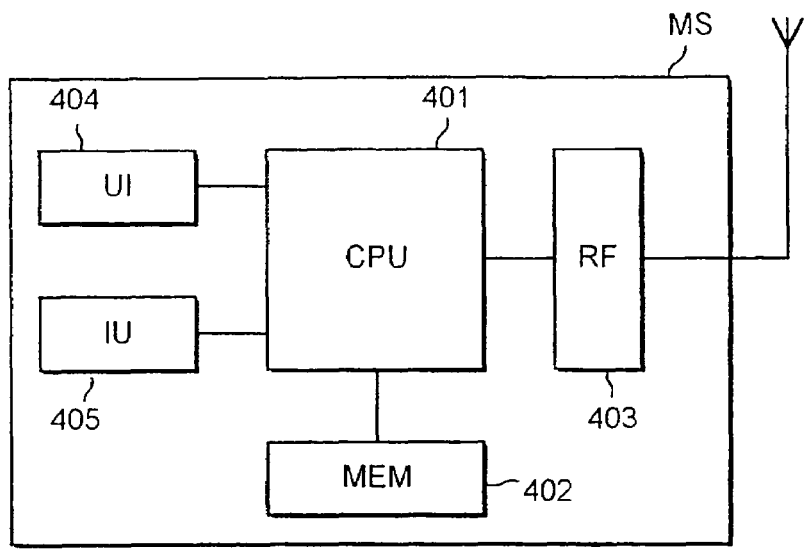
FIG. 10 illustrates the modules of a mobile station.

FIG. 10 is a block diagram illustrating the modules of a mobile station MS. A Central Processing Unit 401 controls the blocks responsible for the mobile station's different functions: a Memory (MEM) 402, a Radio Frequency block (RF) 403, a User Interface (UI) 404 and an Interface Unit (IU) 405. The microprocessor's operating instructions, i.e. program and the mobile station's basic menus have been stored in the mobile station in advance, e.g. during the manufacturing process, in the memory 402. In accordance with its program, the microprocessor uses the RF block 403 for transmitting and receiving messages on the radio path and communicates with the user by the UI 404. The Interface Unit 405 is the link to a data processing entity, and it is controlled by the CPU 401. The data processing entity may be an integrated data processor or external data processing equipment.

Figure 11:
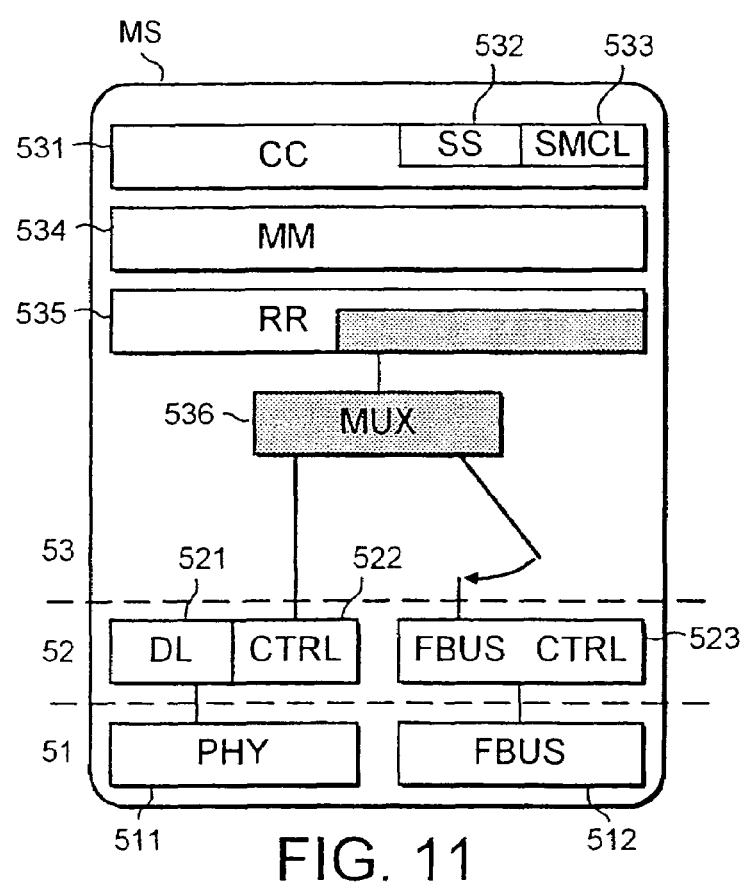
FIG. 11 illustrates the protocol stack of a mobile station MS.

FIG. 11 illustrates the functionalities of a mobile station MS according to the invention, represented with layers 1 to 3 of the 7 OSI reference model. Layers are data communication protocols whose purpose is to provide a link between 2 communicating devices, and are known to a person skilled in the art. The illustrated layers are physical layer (layer 1) 51, data link layer (layer 2) 52 and network layer (layer 3) 53. Network layer 53 of the mobile station MS provides call control management 531 (including supplementary services 532 and short message services 533). This layer also provides mobile management 534 and radio resource management 535. Further, it comprises a MUX 536 which "switches" to a second branch of layer 2 to demand services of the data link (FBUS Ctrl 523) and physical layer (FBUS 522) when the mobile station MS is connected to the communication network through IWU. In any event, the network demands the services of the data link layer 52 (data link 521 and control 522) and the physical layer 51 of the first branch, to allow the mobile station MS to perform and report its measurements about the surrounding GSM network (neighbouring BTSs) and thus comply with GSM requirements.

With e.g. a serial cable, any RF interface or infrared link and with an appropriate software to a PC, the MS enables through the second branch connection to mobile communications network and other telephony entities within the communication network IP. The communication system IP may be one of several kinds, such as a date communication network, internet, intranet, LAN, WAN, ATM packet network.

Figure 12:
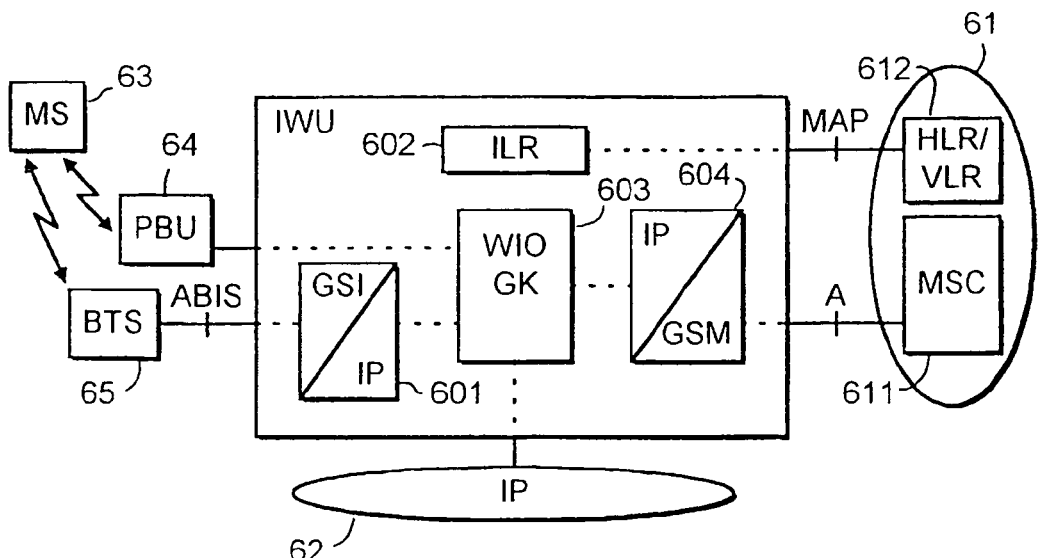
FIG. 12 illustrates a Wireless Internet Office (WIO) concept.

As mentioned earlier, IWU acts as a gateway between system entities. An embodiment of the IWU is shown in FIG. 12 which illustrates the Wireless Internet Office (WIO) concept. WIO allows a MS 63 subscriber to utilize communication networks 62, such as private intranets to carry services of cellular network 61 when within coverage area. In WIO, the IWU comprises several network elements, including an intranet mobile cluster GSM/IP Gateway 601, an intranet location register (ILR) 602, a WIO gatekeeper 63 and a WIO A-gateway 604.

Information such as data and/or speech may be transferred from the mobile station 63 to the IP local area network 62 by two routes, each of which includes a BTS emulator BTSE. In a first mode, the mobile station 63 is connected to the local area network 62 via a personal base unit 64 (PBU), which itself comprises a BTS emulator BTSE.

In a second mode, the mobile station 63 forms part of a mobile cluster. In this case, the information is transmitted to the local area network via a GSM BTS 65 dedicated to that cluster, and an IMC GSM/IP Gateway 601. The BTS transmits the signal over the A bis interface, and the IMC Gateway 601 performs a protocol transform from GSM to H.323, so that the signal can be transmitted over the IP local area network. (As can be seen from this figure, the wireless intranet office architecture uses the H.323 protocol for the signalling and data connections inside the inter-working unit).

The basic access interfaces to the cellular network are the air interface, the A-interface, the MAP protocol, the ISUP/TUP interface and the DSS.1 interface. The A-interface is an interface to mobile switching center and the MAP interface is an interface to HLR/VLR. ISUP/TUP interface connects switching centers, while the DSS.1 interface resides in between of the BSX and switching center. The air interface connecting mobile terminals to the network can be any RF interface or infrared link. Candidate RF interfaces include e.g. Low Power RF (LPRF), 802.11, wireless LAN (WLAN) WATM and HIPERLAN. The air interface can also be replaced with a physical connection (e.g. RS-232 serial cable or Universal Serial Bus (USB). The GSM network sees this new access network as a BSS entity. New network entities are added to the access network to modify/de-modify cellular signalling. System design principle is to fulfil ITU-T's recommendation H.323 and enhances it with mobility extensions.

The WIO A-gateway 604 looks like a base station controller to the MSC611.

Figure 13:
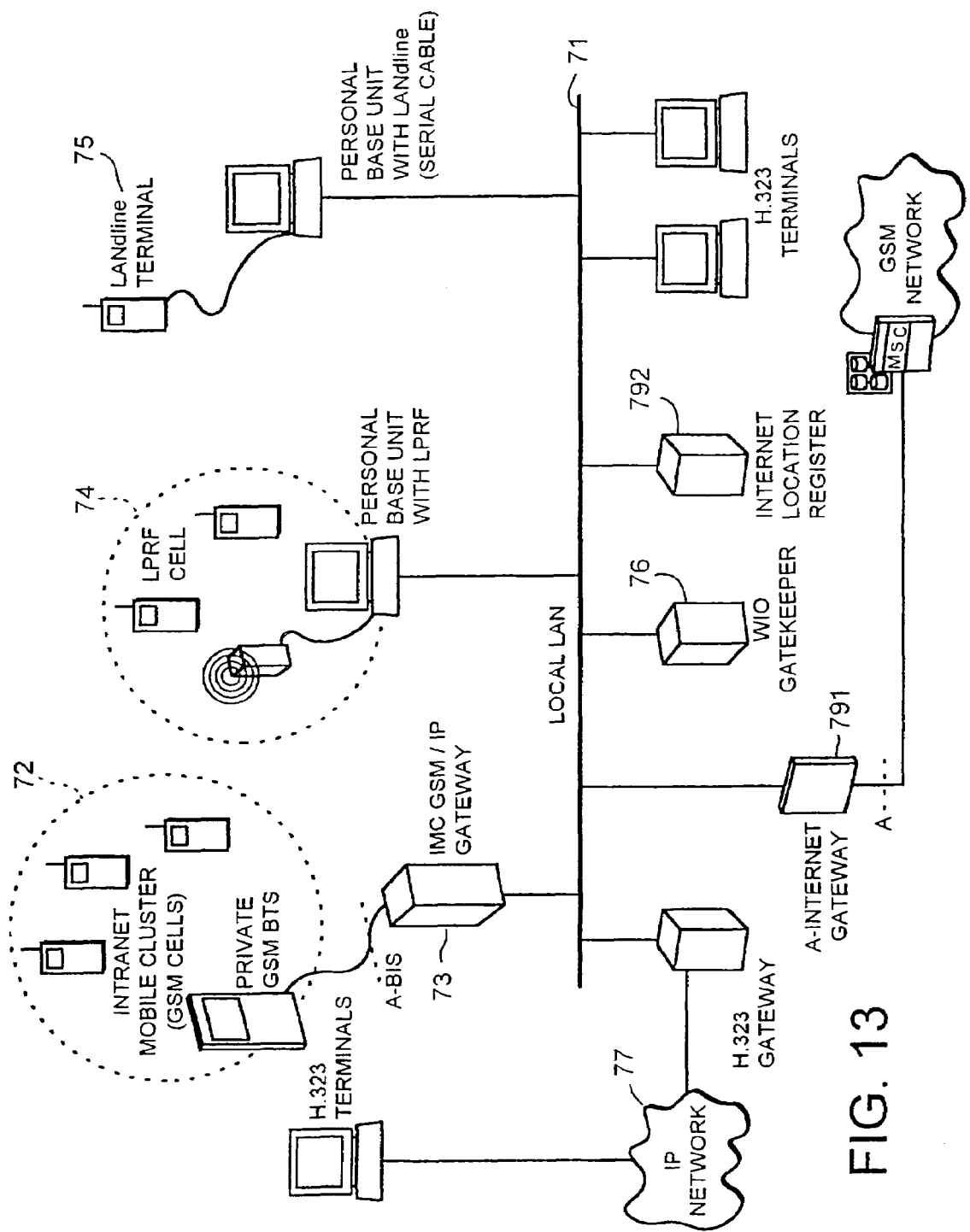
FIG. 13 illustrates an example of a general WIO network architecture.

An example of a general WIO network architecture is shown in FIG. 13. A local area network 71 is provided with an internet mobile cluster IMC72, an LPRF cell 74 and a landline connection 75. The IMC comprises a plurality of mobile stations, a BTS (private GSM BTS) and a server in the form of an IMC GSM/IP gateway. The BTS interface between the BTS and IMC GSM/IP gateway is a GSM A-bis interface. The IMC GSM/IP gateway is responsible for signalling conversions between the GSM and H.323 protocols. The low power RF cell 74 comprises a personal base unit which has a virtual BTS and a low power transceiver, and associated mobile stations with corresponding low power RF transceivers. The PBU is directly connected to the WIO network. To provide the mobile stations with access to the GSM network, the PBU provides conversions between the GSM and H.323 protocols. These conversions can be seen as a bridge between cellular phone and H.323 features, which support WIO location management and mobility features. The landline connection comprises a landline terminal 751 hardwired to a personal base unit 752, which in turn is hardwired to the local area network.

Also connected to the local area network are a WIO gatekeeper 76, which is responsible for the connection of mobile stations to within and outside the network. For example it might route a call from the server to an external system such as PSTN or it could provide connection to the IP network 87. The local area network is further provided with an A-intranet gateway 791 and an intranet location register 792.

In this embodiment the main function of the Intranet Location Register is to store mobility management information and call statistics of the subscribers configured into the Wireless Intranet Office system. Roaming of visitors are controlled by the mobile switching center. For visitors only temporary information will be stored into the Intranet Location Register. The ILR has a MAP interface to cellular system network home location network (not shown here).

The A-Intranet Gateway 791 in this embodiment makes protocol conversion to and from IP protocol at the A-interface, and makes the cellular and Intranet location area associations. It has an operation and management software entity which operates as an administrative server gateway for corresponding agents in intranet Mobile Clusters. The A-intranet Gateway operates as a firewall between public telecommunication network and private Intranet solutions.

The Intranet Mobile Cluster is simulating BSC in a local environment. It consists of minimum set of BTS functionality with reduced physical construction. Intranet Mobile Cluster is a BTS and a BTS driver software package for WindowsNT including rate adaptation, an O&M agent software package and a GSM/IP Telephony Gateway entity. Intranet Mobile Cluster provides inter-working with data services and facsimile as a direct access to IP network, and it may provide local call routing capability within its radio coverage.

The purpose of the GSM/IP Telephony Gateway is to reflect the characteristics of an Internet telephony endpoint to an Intranet Mobile Station, and the reverse, in a transparent fashion. The GSM/IP Telephony Gateway provides appropriate format translation of signalling and speech, i.e., audio format translations between GSM 06.10, 06.20, 06.60, J-STD-007 and G.711, G.723 and transformation of communications procedures. The Gateway performs call setup and clearing on both the Internet telephony side and the Wireless Intranet Office side.

The MS-IP (WIO) Gatekeeper 76,603 provides mobility and call management services, and certain radio resource management functions.

The MS-IP Gatekeeper provides the following services:

Registration control—The MS-IP Gatekeeper authenticates all the network entities, i.e., Intranet Mobile Stations, Intranet Mobile Clusters, A-intranet Gateways. IP Telephony Gateways, Intranet Location Registers, H.323 terminals, which have access to the system. In case of Intranet Mobile Station, authentication and registration is based on automatic Gatekeeper discovery procedure. In other cases, it's based on manual Gatekeeper registration procedure.

Connection ciphering—Part of the Gatekeeper's authentication procedure is connection ciphering service. It provides key distribution, identification and encryption/decryption services to the Gatekeeper and other entities in the system. Service has an option to select ciphering, hashing, key distribution and signature algorithms independently. Key distribution is based on public key cryptography and message ciphering is based on secret key cryptography.

Address translation—The MS-IP Gatekeeper performs E.164 to transport address association and translation. This is done using directory service in the Intranet Location Register which is updated during mobility management procedures, i.e., during TMSI reallocation, authentication, identification, IMSI detach, abort, and location updating.

Call control signalling—The MS-IP Gatekeeper can be configured to route call control signalling to the cellular system network or to the local call management entity within the Gatekeeper Call management—The MS-IP Gatekeeper maintains also a list of ongoing calls and collects call statistics. This information is stored into the Intranet Location Register by the Gatekeeper, and can be used e.g. for billing purposes.

Cellular procedures—The MS-IP Gatekeeper must be able to handle signalling and resource management procedures (BSSMAP resources) specified in GSM recommendation 08.08.

Status control—In order for the MS-IP Gatekeeper to determine if the registered entity is turned off, or has otherwise entered a failure mode, the MS-IP Gatekeeper uses status inquiry to poll the entity at a certain interval.

The MS-IP Gatekeeper entity of this embodiment can be a software package for an operating system fulfilling e.g. ITUT's H.323 Gatekeeper specifications, extended with certain mobility management capabilities according to GSM 04.08.

A preferred embodiment for a Personal Base Unit (PBU) 74 is a PC Card type of radio card for a desktop PC with a piece of software enabling wireless access to IP network. It provides LPRF cordless and wireless LAN—on 2.4 GHz band—dual-mode access exploiting an unlicensed radio spectrum. In cordless, "unlicensed" mode lower layers will be replaced with new ones, but signalling above them remains the cellular one. It also enables intelligent roaming of terminals between different radio frequency bands, i.e. between cellular and unlicensed bands as will be explained later.

Referring back to FIG. 9, the BTSE is the element in the interface between the MS and the IWU. In this embodiment of the invention, the BTSE is a PBU. The PBU and the MS are connected by a radio frequency (preferably LPRF) or infrared connection. Also, they may be indirectly connected, for example via a connection device such as a mobile station cradle, desk-stand or charger.

Figure 14:
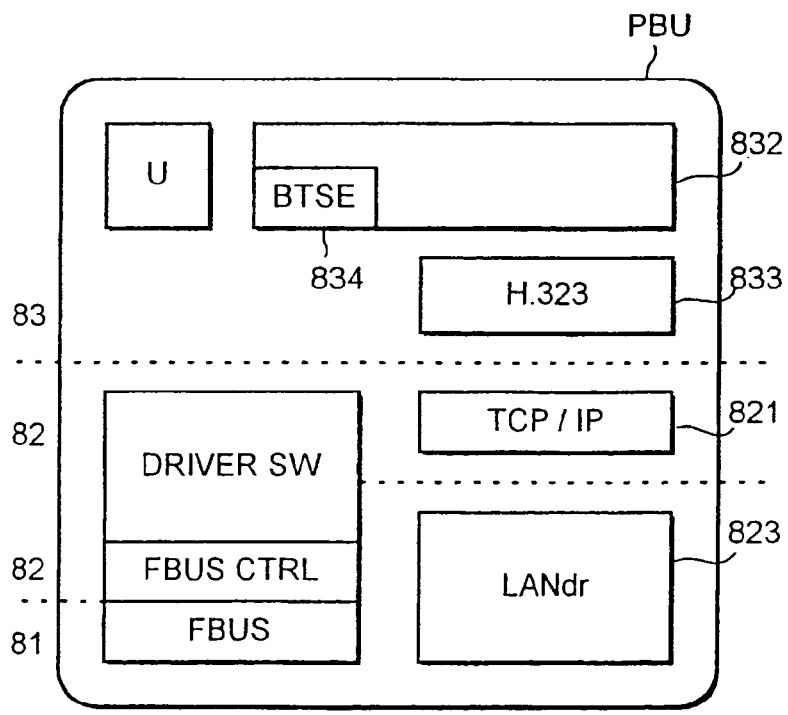
FIG. 14 illustrates the architecture of a personal base unit according to an embodiment of the present invention.

FIG. 14 illustrates the architecture of a personal base unit according to an embodiment of the present invention. A PBU comprises a phone driver implementing the physical and data link layers 81 and 82 (FBUS 811 and FBUS Ctrl 821). The network layer 83 of the PBU comprises a PBU control/IMC core control 832 and an H.323 protocol entity 833 which provide protocol conversion between GSM and H.323. The conversions are needed for GSM layer 3 signalling messages while the speech is carried as GSM coded in the whole in this intranet office network. The PBU further comprises TCP/IP entity 821 and a local area network adapter driver for the 823 for interfacing with the local area network. The PBU control 832 comprises a virtual BTS 834 i.e. a base station emulator BTSE for communicating with the network layer 53 (ref: FIG. 5) of a mobile station MS.

Figure 15:
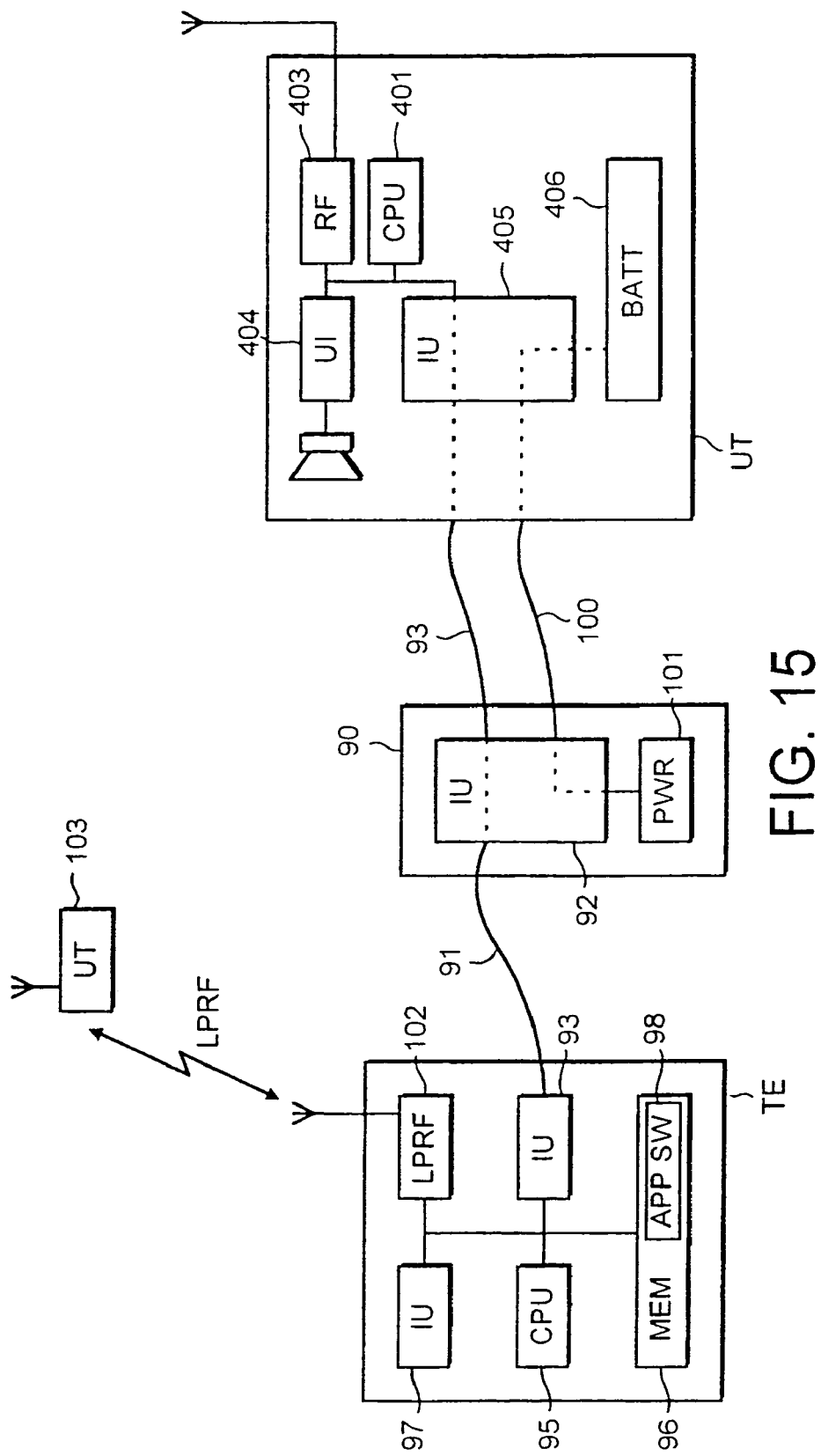
FIG. 15 illustrates a way of connecting mobile station MS according to the invention to terminal equipment TE incorporating a personal base unit (PBU)

When the mobile station MS is outside the wireless intranet office environment, it operates as a normal GSM phone. The MUX 536 does not couple the radio resource management entity 533 with the second branch 523, 512. Voice and signalling is transmitted via the data link layer 52 and physical layer 51 over the first (GSM) branch to the cellular air interface. Also, if the mobile station MS is within the wireless intranet office, but forms part of an intranet mobile cluster, this same path is taken to the cellular air interface and the information and signalling is transmitted to the GSM BTS of that cluster. However, when the mobile station MS is connected to a PBU (for example by an RF 232 serial cable or RF interfaces information such as voice, data, fax, SMS etc., is transmitted over the local area network FIG. 15 shows a way of connecting mobile station MS according to the invention to a terminal equipment TE incorporating the PBU. In this embodiment the connection is carried out by means of a connection device 100. It is appreciated, that any connection method mentioned earlier is possible as well. The connection device 90 in this example can be a cradle such as a desktop stand or desktop charger. Here, by way of example, the connection device is described by means of a charger called intelligent charger 90. The intelligent charger 90 is connected releasably to terminal device TE with physical conducting wire 91 and interface unit 92. Using same interface unit 92 and conducting wire 93 the intelligent charger 90 is also connected releaseably to mobile station MS when mobile station MS has been installed to intelligent charger 90. Conducting wires 91 and 93 form a bus for communication between terminal device TE and mobile station MS via intelligent charger 90. The connections illustrated by conducting wires 91 and 93 may as well implemented in other ways, e.g. by infrared connection or by electrical connectors or the connection device 90 may be integrated into the terminal device TE. Terminal device TE may be e.g. a PC prior known from office environment or a workstation, which comprises among other things processor 95, memory 96 and network interface unit 97 (NI, Network Interface) for connecting terminal device TE to local area network (LAN).

The processor 95 handles the control in the terminal device TE for establishing a connection to the mobile station MS and after an established connection. Such control operations can be implemented as application software 98, which is executed by the processor. Interface 92 of intelligent charger 90 also includes means for arranging the charging voltage from power supply PWR to battery 413 of mobile station MS via conducting wire 100. If the connection device 90 has no own power source, it can get and transfer power to the mobile station from the terminal device TE.

When mobile station MS is connected to a terminal device TE in a way characteristic of the invention, e.g. using interconnecting cable or infrared, or any RF connection, MS operates in a different mode. Switching between the two modes is detected by both terminal device TE and mobile station MS and, depending on the switching method used, switching can be detected in a number of methods. When e.g. multi-core interconnecting cable is used, one of the cores can be allocated for the indication signal. If e.g. in terminal device TE said indication signal is connected to operating voltage (e.g. +5 V), mobile station MS detects the switching in of mobile station MS by monitoring the voltage level of the indication signal e.g. using a level detector. Level detector transfers the information to processor 401 controlling the system, controlled by which mobile station MS and terminal device TE go over to using wired information transfer connection. In a corresponding way terminal device TE can detect connecting to mobile station MS by monitoring an indication signal of same type, the signal level of which a program installed in terminal device TE polls in interface unit 99 at certain, predetermined intervals. Because said computer program executed in processor 95 and memory 96 can be run in the background, it does not have an essential effect in the other operation of terminal device TE. When the cable between mobile station MS and terminal device TE is disconnected, the processor of terminal device TE detects the disconnection from interface unit 99 and processor 401 of mobile station MS from interface units 411 using the detector. The connection can also be switched off manually from the user interface of terminal device TE or from the user interface of mobile station MS.

If the connection between mobile station MS and terminal device TE is realized using an wireless connection, there also is a number of ways for detecting the connection. When the common IrDA (Infrared Data Association) protocol is used, connecting is detected e.g. based upon IAS (Information Access Service)-service, obligatory for devices according to IrDA standard, using a detector. IAS-service means a handshake operation between a device (in this application mobile station MS) and a server (in this application terminal device TE) in which a device can ask a server about services available. The most important information transferred at handshake is LSAP ID (Link Service AccessPoint), which defines the connection point at which the required service is available. It is this information that is required for a successful establishing of a contact. When infrared connection is used, disconnection of connection is detected using infrared transceivers. If the connection is established using low-power transceiver units operating on radio frequency, the establishing and disconnection of a connection takes place according to same type of principle.

If the connection between mobile terminal MS and terminal device TE is established using intelligent charger 90, the processor 95 (executing the application software 98) of terminal device TE is monitoring the establishment of the connection. The processor 95 checks periodically whether mobile station MS has been installed to intelligent charger 90 or not. Alternatively the detecting of the establishment of the connection can be carried out by mobile station MS. In both alternatives this can easily be done e.g. by monitoring the voltage of a pin of a connector as was described above in relation to the embodiment without a separate connection device 90. After the connection has been established, mobile station MS sends an information message to terminal device TE, in which it informs about the connection to intelligent charger 90. The terminal device TE may acknowledge receipt of this message.

In these cases, the MUX 536 demands the service of the second (LAN) branch layers 1 and 2, and layer 3 of the mobile station MS is seen to communicate with the BTS emulator BTSE 834 of the PBU. That is, the information (e.g. speech) and GSM layer 3 signalling messages are redirected to the second branch interface. As the mobile station MS and the PBU are linked, the field strength of the BTSE 914 will be greater than that of other BTSs in the GSM network. Consequently handover is made to the BTSE 834. After this, the handover signalling relating to this BTSE 834 is handled from the MUX through the second branch. When handover has been made, the MUX handles all messages and forwards them to the new host cell through the RS 232 interface etc and "talks" to the other BTSs (as is conventional in GSM) over the first branch. General broadcast traffic is also seen by the mobile station MS, for example from layers 1 and 2 to the MUX and from there through the mobile station/PBU interface to the BTSE 834.

The parameters in the BTSE 834 within the IMC core are set in such a manner that the terminal is forced to remain clamped to this virtual GSM cell. This avoids possible handovers to any other GSM cells the mobile station might hear.

The operation of the MUX can also be explained as follows. When the mobile station changes to network mode, the MUX communicates with the new BTS in a similar way to as it does to other BTSs to which it is not connected. In this phase, the mobile station notices that the field strength of the new BTS relating to this new interface is more powerful than the field strength of other BTSs, and hence makes the handover to this BTS. After the handover, signalling relating to the new BTS are handled by the MUX through the new interface, and "talks" over the GSM radio link with the other BTSs. General broadcast traffic is also sent to the new mobile station, for example from the lower stage to the MUX and from there through the new interface to the virtual BTS.

As explained earlier, when the mobile station MS changes over to the network mode, it is no longer necessary to perform e.g. all RR-specific signalling and signalling for maintaining the connections can be carried out elsewhere. To accommodate this, when changing over to the IP mode, the mobile station transfers the dynamic data relating to the state of the mobile station and the calls in progress to a virtual terminal vMS, which is established in the PBU.

This data is maintained in a state machine, which is located in the virtual terminal. In this context, the state machine means a functional entity that describes the allowed changes in the state relating to the functioning of the mobile station and the related messages according to the protocol. The functionality described by the state machine maintains the data on the possible changes in the state relating to said protocol layer, the instantaneous state, the data structures relating to the change in the state, etc. Thus, a state machine in connection with the GSM means the mobile station's functionality related to the mobile station's GSM Layer 3 protocol (NULL, current switched on, switched to a base station, etc.) In addition, said state machine in the higher level maintains a partial state machine for the mobile station's every connection, whereupon the state of the connection can be, for example, NULL, call initiated, call proceeding, active, etc.

Figure 16:
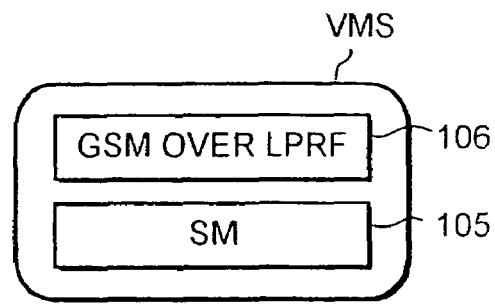
FIG. 16 illustrates the protocol stack of a virtual terminal vMS in the PBU.

The protocol stack of the virtual terminal vMS in PBU illustrated in FIG. 16 comprises the GSM functionality described by a state machine 105, which comprises at least a radio resource (RR), mobility management (MM) and call management (CM), i.e. functions related to protocol layer 3 (ref: 53) in FIG. 11. Above this, there is an additional protocol 106 relating to communication between the PBU and the mobile station operating in the network mode. This will be discussed later in more detail.

When the PBU has the use of the data of the state machine, the PBU starts the virtual terminal vMS, which emulates the functioning of the actual mobile station MS towards the mobile communication system. It receives signals from the mobile communication network and, on the basis of the status data it maintains, it carries out signalling towards the mobile communication system, either independently, or according to the information it requests from the mobile station in network mode. It should be noted that since the state machine during network mode is maintained by the virtual terminal, the signalling to be implemented in different directions is independent, which means that changing of the protocol in either direction does not interrupt the functioning of the virtual terminal.

The virtual terminal may function as illustrated in the flow chart of FIG. 7.

As the connection to the IP it set up and the virtual terminal is established, the use of the mobile station in the network mode differs very much from the original. One good solution is a multi-mode terminal device capable of adjusting its operations according to the operating mode. Another preferred solution is to make use of the more simple configuration needed for operation in network mode by facilitating routing of information to another terminal device, which is more accommodating for the conditions the subscriber currently is. A preferred option is to incorporate a state of the art low power radio frequency transceiver 102 into the PBU (ref FIG. 11) for transceiving information to and from external user terminal (UT) 103 with the simplified commands as described earlier. Such user terminal could be chosen to match the current needs of the user, and could comprise e.g. of a combination of a virtual terminal, wireless headset and a wrist user interface as illustrated in FIG. 17.

Figure 17:
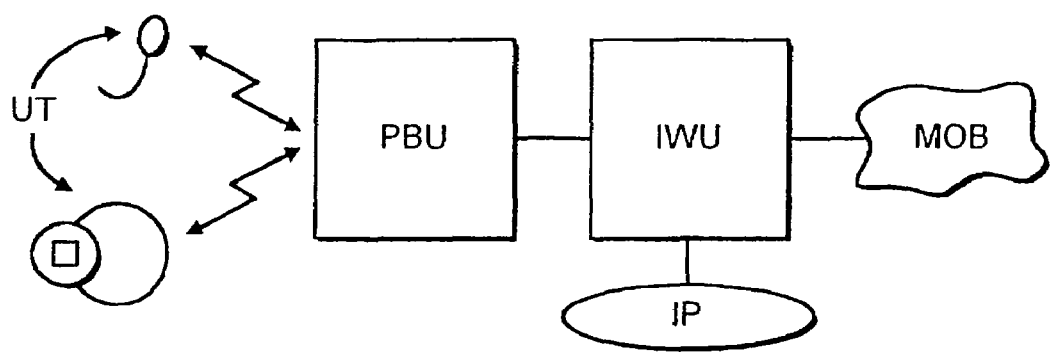
FIG. 17 illustrates a configuration of a preferred embodiment of the invention.

In FIG. 17 services of the mobile communication network MOB are utilized through a communication network IP accessed with a PC as a terminal device. Said terminal device is acting as a PBU, and has therefore an incorporated LPRF server. The user has a Wireless headset WH connected over an air interface using LPRF remote audio protocol, and a wrist watch user interface WUI similarly connected over the air interface using LPRF remote user interface protocol. When a user enters the office carrying his traditional mobile station handset, the phone indicates that LPRF LAN access is available. When the subscriber so wishes, he/she can e.g. plug the handset into an intelligent charger as described before, and thus enable "handsetless operation" using merely wrist UI and a wireless headset. In such an operation, the traditional terminal is inactive and the virtual terminal acts as a mobile station towards the mobile communication network. The traffic between the lightweight terminal and the virtual terminal is carried out through LPRF connection using the specific protocol layer as described earlier. While in office, he/she can walk around the LPRF coverage area and use GSM services without the handset. When leaving the office he/she can enter normal cellular operation by just taking his/her handset along and even continue the ongoing call. The invention thus facilitates a completely wearable communications device in office environment with the user identified as the same mobile subscriber as outside office with handset. The phone numbers, user setting, personalised features etc. will remain in both operating modes.

The implementation and embodiments of the present invention have been presented with the help of examples. It is obvious to a person skilled in the art that the present invention is not restricted to details of the embodiments presented above, and that the invention can also be implemented in another form without deviating from the characteristics of the invention. The embodiments presented above should be considered illustrative, but not restricting. Thus, the possibilities of implementing and using the invention are only restricted by the enclosed claims. Consequently, the various options of implementing the invention as determined by the claims, including the equivalent implementations, also belong to the scope of the invention.

The invention claimed is:

1. A system for transferring information between a mobile station and a mobile communication network, the system comprising:
   the mobile station;
   the mobile communication network;
   a communication network for interfacing the mobile station and the mobile communication network;
   wherein the communication network is arranged to comprise a mobile station emulator when the mobile station is coupled to the communication network; and
   the mobile station emulator comprising:
      means for receiving call transfer information from the mobile station and for forwarding the call transfer information over a communication network to the mobile communication network, upon coupling of the mobile station to the communication network; and
      means for maintaining the call transfer information to be used by the mobile station emulator in a call transfer process while the mobile station remains coupled to the communication network and while the mobile station switches to an access protocol of the communication network, the access protocol of the communication network being different from an access protocol of the mobile communication network.

2. The system as claimed in claim 1, wherein the mobile station emulator is established in an interworking unit of the communication network.

3. A system as claimed in claim 1, wherein the communication network comprises an interface device for interfacing with the mobile station, and the mobile station emulator is established in the interface device.

4. A system as claimed in claim 1, further comprising a user terminal and wherein the mobile communication network comprises means for communicating with the user terminal.

5. A mobile station emulator for a system as claimed in claim 1.

6. The mobile station emulator as claimed in claim 5 comprising means for transmitting the call transfer information to the mobile station as the mobile emulator prepares to decouple from the communication network.

7. A mobile station emulator for interfacing a mobile station and a mobile communication network, the mobile station emulator comprising:
   means for receiving call transfer information from the mobile station and for forwarding the call transfer information over a communication network to the mobile communication network, upon coupling of the mobile station to the communication network; and
   means for maintaining the call transfer information to be used by the mobile station emulator in a call transfer process while the mobile station remains coupled to the communication network and while the mobile station switches to an access protocol of the communication network, the access protocol of the communication network being different from an access protocol of the mobile communication network.

8. A mobile station emulator for a system for transferring information between a mobile station and a mobile communication network, the system comprising:
   the mobile station;
   the mobile communication network;
   a communication network for interfacing the mobile station and the mobile communication network;
   wherein the communication network is arranged to comprise the mobile station emulator when the mobile station is coupled to the communication network,
   the mobile station emulator comprising:
      means for receiving call transfer information from the mobile station and for forwarding the call transfer information over a communication network to the mobile communication network, upon coupling of the mobile station to the communication network;
      means for maintaining the call transfer information to be used by the mobile station emulator while the mobile station remains coupled to the communication network, wherein the mobile station emulator switches to an access protocol of the communication network, the access protocol of the communication network being different from an access protocol of the mobile communication network;
      means for receiving call status data from the mobile station upon coupling of the mobile station to the communication network; and
      means for maintaining the call status data while the mobile station remains coupled to the communication network.

9. A method for transferring information between a mobile station and a mobile communication network, wherein a communication network is interfaced between the mobile station and the mobile communication network, the method comprising:
   establishing a connection from the mobile station to a mobile station emulator comprising the communication network;
   transferring call transfer information to the mobile station emulator from the mobile station and forwarding the call transfer information over the communication network to the mobile communication network, upon coupling of the mobile station to the communication network; and
   maintaining the call transfer information in the mobile station emulator to be used by the mobile station emulator in a call transfer process while the mobile station remains coupled to the communication network and while the mobile station switches to an access protocol of the communication network, the access protocol of the communication network being different from an access protocol of the mobile communication network.

10. A method for transferring information between a mobile station and a mobile communication network, wherein a communication network is interfaced between the mobile station and the mobile communication network, the method comprising:

establishing a connection from the mobile station to a mobile station emulator comprising the communication network;

transferring call transfer information to the mobile station emulator from the mobile station and forwarding the call transfer information over the communication network to the mobile communication network, upon coupling of the mobile station to the communication network;

maintaining the call transfer information in the mobile station emulator to be used by the mobile station emulator while the mobile station remains coupled to the communication network, wherein the mobile station emulator switches to an access protocol of the communication network, the access protocol of the communication network being different from an access protocol of the mobile communication network; and transmitting call status data from the mobile station to the mobile station emulator when the communication connection changes from between the mobile station and the mobile communication network to between the mobile station and the communication network.

11. A method for transferring information between a mobile station and a mobile communication network, wherein a communication network is interfaced between the mobile station and the mobile communication network, the method comprising:

establishing a connection from the mobile station to a mobile station emulator comprising the communication network;

transferring call transfer information to the mobile station emulator from the mobile station and forwarding the call transfer information over the communication network to the mobile communication network, upon coupling of the mobile station to the communication network;

maintaining the call transfer information in the mobile station emulator to be used by the mobile station emulator while the mobile station remains coupled to the communication network, wherein the mobile station emulator switches to an access protocol of the communication network, the access protocol of the communication network being different from an access protocol of the mobile communication network; and transmitting call status data from the mobile station emulator to the mobile station when the communication connection changes from between the mobile station and the communication network to between the mobile station and the mobile communication network.

* * * * *